Patented May 25, 1954

2,679,518

UNITED STATES PATENT OFFICE 2,679,518

ACIDIC ESTERS OF OXYPROPYLATED RESORCINOL

Melvin De Groote, University City, Mo., assignor to Petrolite Corporation, a corporation of Delaware No Drawing. Application May 14, 1951, Serial No. 226,331

10 Claims. (Cl. 260—475)

The present invention is concerned with certain new chemical products, compounds, or compositions which have useful application in various arts. It includes methods or procedures for manufacturing said new chemical products, compounds or compositions, as well as the products, compounds, or compositions themselves.

Complementary to the above aspect of the invention herein disclosed is my companion invention concerned with the use of these particular chemical compounds, or products, as demulsifying agents in processes or procedures particularly adapted for preventing, breaking, or resolving emulsions of the water-in-oil type, and particularly petroleum emulsions. See my copending application Serial No. 226,330, filed May 14, 1951, now Patent No. 2,626,928.

Said new compositions are fractional esters obtained from a polycarboxy acid and a diol obtained by the oxypropylation of resorcinol or an ether alcohol obtained by treating resorcinol with not over 4 moles of ethylene oxide. The structure of resorcinol is indicated by the following formula:

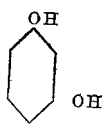

The ethers obtained from resorcinol and ethylene oxide suitable as reactants in preparing the herein described compounds, may be indicated by the following formula:

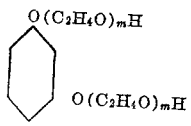

with the proviso that $m$ is a numeral varying from 0 to 4, and with the further proviso that the sum of both occurrences of $m$ is not over 4, and not more than one occurrence of $m$ is 0; in other words, one mole of resorcinol being made and treated with 1, 2, 3 or 4 moles of ethylene oxide. The manufacture of such hydroxy ethers is conventional. If both phenolic hydroxyl radicals are converted into ethanol radicals, as is usually the case, and 2 or more moles of ethylene oxide were used per mole of resorcinol, then the compounds may be appropriately considered as glycol ethers.

For convenience, the hydroxylated compounds, i. e., resorcinol itself, or the oxyethylated derivatives previously described, may be indicated by the formula HOR'OH. Such products are water-soluble. Indeed, the oxyethylated derivatives would be more water-soluble, so to speak, than resorcinol itself. If resorcinol or such derivatives are reacted with propylene oxide, they are converted from water-soluble kerosene-insoluble products into products which are water-insoluble and almost in every instance also kerosene-soluble. If such products are so reacted, the resultant compound obtained by oxypropylation may be indicated thus:

$$H(OC_3H_6)_nOR'O(C_3H_6O)_{n'}H$$

with the proviso that $n$ and $n'$ represent whole numbers, which, added together, equal a sum varying from 15 to 80, and the acidic esther obtained by reaction of the polycarboxy acid, may be indicated thus:

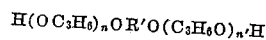

in which the characters have their previous significance, and $n''$ is a whole number not over 2, and R is the radical of the polycarboxy acid.

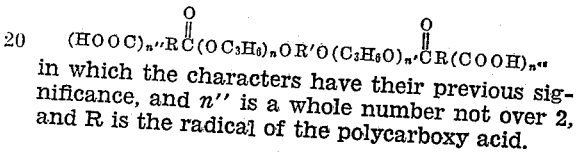

and preferably free from any radicals having more than 8 uninterrupted carbon atoms in a single group, and with the further proviso that the parent diol, prior to esterification, be preferably water-insoluble and kerosene-soluble.

Attention is directed to the co-pending application of Charles M. Blair, Jr., Serial No. 70,811, filed January 13, 1949, now Patent No. 2,562,878, in which there is described, among other things, a process for breaking petroleum emulsions of the water-in-oil type, characterized by subjecting the emulsion to the action of an esterification product of a dicarboxylic acid and a polyalkylene glycol, in which the ratio of equivalents of polybasic acid to equivalents of polyalkylene glycol, is in the range of 0.5 to 2.0, in which the alkylene group has from 2 to 3 carbon atoms, and in which the molecular weight of the product is between 1,500 and 4,000.

Similarly, there have been used esters of dicarboxy acids and polypropylene glycols, in which 2 moles of the dicarboxy acid esters have been reacted with one mole of a polypropylene glycol having a molecular weight, for example, of 2,000, so as to form an acidic fractional ester. Subsequent examination of what is said herein, in comparison with the previous example, as well as the hereto appended claims, will show the line of delineation between such somewhat comparable compounds. Of greater significance, however, is what is said subsequently in regard to the structure of the parent diol, as compared to polypropylene glycols whose molecular weights may vary from 1,000 to 2,000.

Although the herein described products have a number of industrial applications, they are of particular value for resolving petroleum emulsions of the water-in-oil type that are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in my copending application Serial No. 226,330, filed May 14, 1951, now Patent No. 2,626,928.

The new products are useful as wetting, detergents and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics, spray oils, water-repellent textile finishes; as lubricants, etc.

For convenience, what is said hereinafter will be divided into four parts:

Part 1 will be concerned with the oxypropylation of resorcinol or oxyethylated derivatives of the kind previously mentioned;

Part 2 will be concerned with the preparation of esters from the aforementioned oxypropylation derivatives;

Part 3 will be concerned with the structure of the herein described diols and its significance in light of what is said subsequently; and Part 4 will be concerned with certain derivatives which can be obtained from diols of the type aforementioned.

PART 1

For a number of well known reasons, equipment, whether laboratory size, semi-pilot plant size, pilot plant size, or large scale size, is not, as a rule, designed for a particular alkylene oxide. Invariably, and inevitably, however, or particularly in the case of laboratory equipment and pilot plant size, the design is such as to use any of the customarily available alkylene oxides, i. e., ethylene oxide, propylene oxide, butylene oxide, glycide, epichlorohydrin, styrene oxide, etc. In the subsequent description of the equipment it becomes obvious that it is adapted for oxyethylation, as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example, 95 to 120° C. Under such circumstances, the pressure will be less than 30 pounds per square inch, unless some special procedure is employed, as is sometimes the case, to wit, keeping an atmosphere of inert gas such as nitrogen in the vessel during the reaction. Such low-temperature-low-reaction rate oxypropylations have been described very completely in U. S. Patent No. 2,448,664, to H. R. Fife et al., dated September 7, 1948. Low-temperature-low-pressure oxypropylations are particularly desirable where the compound being subjected to oxypropylation contains one, two, or three points of reaction only, such as monohydric alcohols, glycols and triols.

Since low-pressure-low-temperature-low-reaction-speed oxypropylations require considerable time, for instance, 1 to 7 days of 24 hours each to complete the reaction, they are conducted, as a rule, whether on a laboratory scale, pilot plant scale, or large scale, so as to operate automatically. The prior figure of seven days applied especially to large-scale operations. I have used conventional equipment with two added automatic features: (a) a solenoid-controlled valve which shuts off the propylene oxide in event that the temperature gets outside a predetermined and set range, for instance, 95° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose, where the pressure of reaction is higher, speed of reaction is higher, and time of reaction is much shorter. In such instances, such automatic controls are not necessarily used.

Thus, in preparing the various examples, I have found it particularly advantageous to use laboratory equipment or pilot plant which is designed to permit continuous oxyalkylation, whether it be oxypropylation or oxyethylation. With certain obvious changes, the equipment can be used also to permit oxyalkylation involving the use of glycide where no pressure is involved except the vapor pressure of a solvent, if any, which may have been used as a diluent.

As previously pointed out, the method of using propylene oxide is the same as ethylene oxide. This point is emphasized only, for the reason that the apparatus is so designed and constructed as to use either oxide.

The oxypropylation procedure employed in the preparation of the oxyalkylated derivatives has been uniformly the same, particularly in light of the fact that a continuous, automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement, as far as propylene oxide goes, unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and preferably, coils in addition thereto, with the jacket so arranged that it is suitable for heating with steam or cooling with water, and further equipped with electrical heating devices. Such autoclaves, are, of course, in essence, small-scale replicas of the usual conventional autoclave used in oxyalkylation procedures. In some instances, in exploratory preparations, having a small capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, but somewhat in excess thereof. In some instances, a larger bomb was used, to wit, one having a capacity of about one gallon. This bomb was equipped also with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose or tubing, so that continuous weighings could be made without breaking or making any connections. This applies also to the nitrogen line which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range, or if pressure in the autoclave passes out of predetermined range.

With this particular arrangement practically all oxypropylations become uniform, in that the reaction temperature was held within a few degrees of any selected point, for instance, if 105° C. was selected as the operating temperature, the maximum point would be at the most 110° C. or 112° C., and the lower point would be 95° C., or possibly, 98° C. Similarly, the pressure was held at approximately 30 pounds maximum within a 5-pound variation one way or the other, but might drop to practically zero, especially where no solvent such as xylene is employed. The speed of reaction was comparatively slow under such conditions, as compared with oxyalkylations at 200° C. Numerous reactions were conducted in which the time varied from one day (24 hours) up to three days (72 hours), for completion of the final member of a series. In some instances, the reaction may take place in considerably less time, i. e., 24 hours or less, as far as a partial oxypropylation is concerned.

The minimum time recorded in subsequent data is about 8 hours. The reactions indicated as being complete in 8 to 10 hours, for example, may have been complete in a lesser period of time in light of the automatic equipment employed. This applies also to where larger autoclaves were used, and the reactions were completed in approximately one-half the time indicated for laboratory size autoclaves. In the addition of propylene oxide, in the autoclave equipment, as far as possible, the valves were set so all the propylene oxide was fed in at a rate so the predetermined amount reacted in the first two-thirds of the selected period; for instance, if the selected period was 8 hours, the rate was set so the oxide could be fed in in about 5½ hours, or less. This meant that if the reaction were interrupted automatically for a period of time for the pressure to drop or the temperature to drop, the predetermined amount of oxide would still be added in most instances well within the predetermined time period. In one of the experiments, the addition of oxide was made over a comparatively longer period, i. e., 20 hours. In such instances, of course, the reaction could be speeded up to quite a marked degree.

When operating at a comparatively high temperature, for instance, between 150° to 200° C., an unreacted alkylene oxide such as propylene oxide, makes its presence felt in the increase in pressure or the consistency of a higher pressure. However, at a low enough temperature, it may happen that the propylene oxide goes in as a liquid. If so, and if it remains unreacted, there is, of course, an inherent danger, and appropriate steps must be taken to safeguard against this possibility; if need be, a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight, the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature, even in large scale operations, as much as a week or ten days' time may lapse to obtain some of the higher molecular weight derivatives from monohydric or dihydric materials.

In a number of operations the counterbalance scale or dial scale holding the propylene oxide bomb was so set that when the predetermined amount of popylene oxide had passed into the reaction, the scale movement through a time operating device was set for either one to two hours, so that reaction continued for 1½ to 2½ hours after the final addition of the last propylene oxide, and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic, insofar that the feed stream was set for a slow, continuous run which was shut off in case the pressure passed a predetermined point, as previously set out. All the points of design, construction, etc., were conventional, including the gauges, check valves and entire equipment. As far as I am aware, at least two firms, and possibly three, specialize in autoclave equipment, such as I have employed in the laboratory, and are prepared to furnish equipment of this same kind. Similarly, pilot plant equipment is available. This point is simply made as a precaution in the direction of safety. Oxyalkylations, particularly involving ethylene oxide, glycide, propylene oxide, etc., should not be conducted except in equipment specifically designed for the purpose.

Example 1a

The dihydroxy compound employed was resorcinol of technical purity. The autoclave employed was a small autoclave having a capacity of approximately one gallon. The autoclave was equipped with various automatic devices. In some instances, in similar oxypropylations employing either resorcinol or the oxyethylated derivatives of the kind previously described, the oxypropylations were speeded up and manual control used entirely. In this example, and in Examples 2a through 4a, following, the automatic devices were employed. Needless to say, it is immaterial in which way the autoclave is handled.

200 grams of resorcinol were charged into the autoclave along with 20 grams of caustic soda. It is to be noted that other alkaline catalysts of the conventional type, such as sodium methylate, caustic potash, etc., would be equally satisfactory. The reaction pot was flushed out with nitrogen, the autoclave was sealed and the automatic devices adjusted for injecting 1620 grams of propylene oxide in approximately 8 hours. The pressure regulator was set for a maximum of 35 pounds per square inch. This meant that the bulk of the reaction could take place and probably did take place at a comparatively lower pressure. This comparatively lower pressure was the result of the fact that, at least in part, considerable catalyst was present. The propylene oxide was added at approximately 200 to 300 grams per hour in this particular instance. The time required to add all the oxide was about 8 hours. More important, the selected temperature range was 115° C. (just moderately above the boiling point of water). The initial introduction of propylene oxide was not started until the heating devices had raised the temperature to above 108° C. At the completion of the reaction, the molecular weight, based on the hydroxyl determination, was 866 compared with a theoretical molecular weight of 1000. In this instance, the entire reaction mass was reserved for subsequent esterification.

Example 2a

The same procedure was employed as in Example 1a, preceding, except that the amount of oxide added was increased in proportion. The amount of resorcinol employed was 100 grams. The amount of propylene oxide employed was 1720 grams. The amount of catalyst employed was 10 grams. The conditions of reaction, as far as temperature and pressure were concerned, were identical with those described in Example 1a, preceding. The oxide was added somewhat more slowly, due, in part, to a lower catalyst concentration. The rate of addition was about 100 to 200 grams per hour. The time required to add the propylene oxide was 11 hours.

In this instance also when the oxypropylation was complete, the entire mass was saved for subsequent esterification.

Example 3a

The procedure followed was identical with that used in Example 1a, preceding. The amount of resorcinol employed was 70 grams; the amount of propylene oxide employed was 1850 grams; the amount of catalyst employed was 7 grams. The conditions, as far as temperature and pressure were concerned, were identical with Examples 1a and 2a, preceding. The time period was longer, to wit, 16 hours. The addition rate of oxide was about 150 grams per hour. The entire reaction mass was saved for subsequent esterification.

Example 4a

The same procedure was employed as in the three previous examples. The amounts of resorcinol employed was 50 grams; the amount of propylene oxide employed was 1775 grams; the amount of catalyst employed was 5 grams. Conditions of temperature and pressure were the same as in the three previous examples. The reaction time was somewhat longer, to wit, 20 hours. The addition rate of oxide varied from 125 to 150 grams per hour. The entire reaction mass was retained for subsequent esterification.

What has been said herein is presented in tabular form in Table 1 immediately following, with some added information as to molecular weight and as to solubility of the reaction product in water, xylene and kerosene.

TABLE 1

| Ex. No. | Composition Before | | | Theo. Mol. Wt. | Composition at end | | | M. W. by Hyd. Determin. | Max. Tem., ° C. | Max. Pres., lbs. sq. in. | Time, hrs. |
|---|---|---|---|---|---|---|---|---|---|---|---|
| | H. C.[1] Amt., lbs. | Oxide Amt., lbs. | Catalyst, lbs. | | H. C.[1] Amt., lbs. | Oxide Amt., lbs. | Catalyst, lbs. | | | | |
| 1a | 200 | 1,620 | 20 | 1,000 | 200 | 1,620 | 20 | 866 | 115 | 35 | 8 |
| 2a | 100 | 1,720 | 10 | 2,000 | 100 | 1,720 | 10 | 1,620 | 115 | 35 | 11 |
| 3a | 70 | 1,850 | 7 | 3,020 | 70 | 1,850 | 7 | 1,845 | 115 | 35 | 16 |
| 4a | 50 | 1,775 | 5 | 4,020 | 50 | 1,775 | 5 | 1,760 | 115 | 35 | 20 |

[1] The hydroxylated compound is resorcinol.

Example 1a was emulsifiable in water, soluble in xylene but insoluble in kerosene. Examples 2, 3a and 4a were all insoluble in water, but soluble in both xylene and kerosene.

Following the same procedure, and this applies also to derivatives of resorcinol treated with 1, 2, 3 or 4 moles of ethylene oxide, I have made series in which the theoretical molecular weight, assuming completeness of reaction, has been at least twice as high as indicated in the above table, for instance, in the range of 8,000 to 10,000, and the hydroxyl molecular weight has been in the range of 2,000 to 3,000. In all instances, the products were water-insoluble, and xylene-soluble and kerosene-soluble.

The final products, i. e., at the end of the oxypropylation step, were somewhat viscous, amber-colored fluids which were water-insoluble. This was characteristic of all various end products obtained in these series. These products were, of course, slightly alkaline, due to the residual caustic soda employed. This would be the case also if sodium methylate were used as a catalyst.

Speaking of insolubility in water or solubility in kerosene, such solubility test can be made simply by shaking small amounts of the materials in a test tube with water present, for instance, using 1% to 5% approximately based on the amount of water present.

Needless to say, there is no complete conversion of propylene oxide into the desired hydroxylated compounds. This is indicated by the fact that the theoretical molecular weight, based on a statistical average, is greater than the molecular weight calculated by usual methods of acetyl or hydroxyl value. Actually, there is no completely satisfactory method for determining molecular weights of these types of compounds with a high degree of accuracy, when the molecular weights exceed 2,000. In some instances, the acetyl value or hydroxyl value serves as satisfactorily as an index to the molecular weight as any other procedure, subject to the above limitations, and especially in the higher molecular weight range. If any difficulty is encountered in the manufacture of the esters, as described in Part 2, the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

*Part 2*

As previously pointed out, the present invention is concerned with acidic esters obtained from the oxypropylated derivatives described in Part 1, immediately preceding, and polycarboxy acids, particularly tricarboxy acids like citric and dicarboxy acids, such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from products such as maleic anhydride, and cyclopentadiene. Such acids should be heat-stable, so they are not decomposed during esterification. They may contain as many as 36 carbon atoms, as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used, such as the low molal ester, the anhydride, the acyl chloride, etc. However, for purpose of economy, it is customary to use either the acid or the anhydride. A conventional procedure is employed. On a laboratory scale one can employ a resin pot of the kind described in U. S. Patent No. 2,499,370, dated March 7, 1950, to De Groote and Keiser, and particularly with one more opening to permit the use of a porous spreader, if hydrochloric acid gas is to be used as a catalyst. Such device or absorption spreader consists of minute alundum thimbles which are connected to a glass tube. One can add a sulfonic acid such as para-toluene sulfonic acid as a catalyst. There is some objection to this because, in some instances, there is some evidence that this acid catalyst tends to decompose or rearrange the oxypropylated compounds, and particularly likely to do so if the esterification temperature is too high. In the case of polycarboxy acids such as diglycolic acid, which is strongly acidic, there is no need to add any catalyst. The use of hydrochloric acid gas has one advantage over para-toluene sulfonic acid, and that is, that at the end of the reaction it can be removed by flushing out with nitrogen, whereas, there is no reasonably convenient means available of removing the para-toluene sulfonic acid or other sulfonic acid employed. If hydrochloric acid is employed, one need only pass the gas through at an exceedingly slow rate so as to keep the reaction mass acidic. Only a trace of acid needs be present. I have employed hydrochloric acid gas or the aqueous acid itself to eliminate the initial basic material. My preference, however, is to use no catalyst whatsoever and to insure complete dryness of the diol, as described in the final procedure just preceding Table 2.

The products obtained in Part 1, preceding, may contain a basic catalyst. As a general procedure, I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage, needless to say, a second filtration may be required. In any event, the neutral or slightly acidic solution of the oxypropylated derivatives described in Part 1 is then diluted further with sufficient xylene, decalin, petroleum solvent, or the like, so that one has obtained approximately a 45% solution. To this solution there is added at polycarboxylated reactant, as previously described, such as phthalic anhydride, succinic acid or anhydride, diglycollic acid, etc. The mixture is refluxed until esterification is complete, as indicated by elimination of water or drop in carboxyl value. Needless to say, if one produces a half-ester from an anhydride, such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent, or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force, so as to eliminate the hydrated sodium sulfate and probably the sodium chloride formed. The clear, somewhat viscous, amber liquid so obtained may contain a small amount of sodium sulfate or sodium chloride, but in any event, is perfectly acceptable for esterification in the manner described.

It is to be pointed out that the products here described are not polyesters in the sense that there is a plurality of both diol radicals and acid radicals; the product is characterized by having only one diol radical.

In some instances, and in fact, in many instances, I have found that in spite of the dehydration methods employed above, that a mere trace of water still comes through and that this mere trace of water certainly interferes with the acetyl or hydroxyl value determination, at least when a number of conventional procedures are used, and may retard esterification, particularly where there is no sulfonic acid or hydrochloric acid present as a catalyst. Therefore, I have preferred to use the following procedure: I have employed about 200 grams of the diol, as described in Part 1, preceding: I have added about 60 grams of benzene, and then refluxed this mixture in the glass resin pot, using a phase-separating trap until the benzene carried out all the water present as water of solution or the equivalent. Ordinarily, this refluxing temperature is apt to be in the neighborhood of 130° to possibly 150° C. When all this water or moisture has been removed, I also withdraw approximately 20 grams or a little less benzene and then add the required amount of the carboxy reactant and also about 150 grams of a high boiling aromatic petroleum solvent. These solvents are sold by various oil refineries, and, as far as solvent effect, act as if they were almost completely aromatic in character. Typical distillation data in the particular type I have employed and found very satisfactory are the following:

I. B. P., 142° C.
5 ml., 200° C.
10 ml., 209° C.
15 ml., 215° C.
20 ml., 216° C.
25 ml., 220° C.
30 ml., 225° C.
35 ml., 230° C.
50 ml., 242° C.
55 ml., 244° C.
60 ml., 248° C.
65 ml., 252° C.
70 ml., 252° C.
75 ml., 260° C.
80 ml., 264° C.
85 ml., 270° C.
40 ml., 234° C.
45 ml., 237° C.
90 ml., 280° C.
95 ml., 307° C.

After this material is added, refluxing is continued, and, of course, is at a high temperature, to wit, about 160° to 170° C. If the carboxy reactant is an anhydride, needless to say, no water of reaction appears; if the carboxy reactant is an acid water of reaction should appear and should be eliminated at the above reaction temperature. If it is not eliminated, I simply separate out another 10 or 20 cc. of benzene by means of the phase-separating trap, and thus raise the temperature to 180° to 190° C. or even to 200° C., if need be. My preference is not to go above 200° C.

The use of such solvent is extremely satisfactory, provided one does not attempt to remove the solvent subsequently, except by vacuum distillation, and provided there is no objection to a little residue. Actually, when these materials are used for a purpose such as demulsification, the solvent might just as well be allowed to remain. If the solvent is to be removed by distillation, and particularly vacuum distillation, then the high boiling aromatic petroleum solvent might well be replaced by some more expensive solvent, such as decalin, or an alkylated decalin solvent, which has a rather definite or close range boiling point. The removal of the solvent, of course, is purely a conventional procedure and requires no elaboration.

In the appended table Solvent #7-3, which appears in numerous instances, is a mixture of 7 volumes of the aromatic petroleum solvent previously described and 3 volumes of benzene. Reference to Solvent #7 means the particular petroleum solvent previously described in detail. This was used, or a similar mixture, in the manner previouesly described. A large number of the examples indicated employing decalin were repeated, using this mixture, and particularly with the preliminary step of removing all the water. If one does not intend to remove the solvent, my preference is to use the petroleum solvent-benzene mixture, although obviously any of the other mixtures, such as decalin and xylene, can be employed.

The data included in the subsequent tables, i. e., Tables 2 and 3, are self-explanatory, and very complete, and it is believed no further elaboration is necessary.

TABLE 2

| Ex. No. of Acid Ester | Ex. No. of Hydroxy Cmpd. | Theo. M. W. of H. O. | Theo. Hydroxyl V. of H. C. | Actual Hydroxyl Value | Mol. Wt. Based on Actual H. V. | Amt. of Hyd. Cmpd. (grs.) | Polycarboxy Reactant | Amt. of Polycarboxy Reactant (grs.) |
|---|---|---|---|---|---|---|---|---|
| 1b | 1a | 1,000 | 112.5 | 130 | 866 | 208 | Diglycollic Acid | 64.2 |
| 2b | 1a | 1,000 | 112.5 | 130 | 866 | 202 | Oxalic Acid | 58.4 |
| 3b | 1a | 1,000 | 112.5 | 130 | 866 | 197 | Maleic Anhydride | 44.5 |
| 4b | 1a | 1,000 | 112.5 | 130 | 866 | 211 | Phthalic Anhydride | 72.0 |
| 5b | 1a | 1,000 | 112.5 | 130 | 866 | 201 | Citraconic Anhydride | 51.8 |
| 6b | 1a | 1,000 | 112.5 | 130 | 866 | 219 | Aconitic Acid | 88.0 |
| 7b | 2a | 2,000 | 56.1 | 74.0 | 1,520 | 210 | Diglycollic Acid | 37.0 |
| 8b | 2a | 2,000 | 56.1 | 74.0 | 1,520 | 211 | Oxalic Acid | 35.0 |
| 9b | 2a | 2,000 | 56.1 | 74.0 | 1,520 | 218 | Maleic Anhydride | 28.0 |
| 10b | 2a | 2,000 | 56.1 | 74.0 | 1,520 | 198 | Phthalic Anhydride | 38.4 |
| 11b | 2a | 2,000 | 56.1 | 74.0 | 1,520 | 209 | Citraconic Anhydride | 30.9 |
| 12b | 2a | 2,000 | 56.2 | 74.0 | 1,520 | 210 | Aconitic Acid | 48.0 |
| 13b | 3a | 3,020 | 37.2 | 61.0 | 1,845 | 202 | Diglycollic Acid | 29.4 |
| 14b | 3a | 3,020 | 37.2 | 61.0 | 1,845 | 214 | Oxalic Acid | 29.2 |
| 15b | 3a | 3,020 | 37.2 | 61.0 | 1,845 | 208 | Maleic Anhydride | 22.2 |
| 16b | 3a | 3,020 | 37.2 | 61.0 | 1,845 | 199 | Phthalic Anhydride | 32.0 |
| 17b | 3a | 3,020 | 37.2 | 61.0 | 1,845 | 199 | Citraconic Anhydride | 22.8 |
| 18b | 3a | 3,020 | 37.2 | 61.0 | 1,845 | 202 | Aconitic Acid | 38.1 |
| 19b | 4a | 4,020 | 28.0 | 64.0 | 1,760 | 211 | Diglycollic Acid | 32.1 |
| 20b | 4a | 4,020 | 28.0 | 64.0 | 1,760 | 202 | Oxalic Acid | 29.0 |
| 21b | 4a | 4,020 | 28.0 | 64.0 | 1,760 | 201 | Maleic Anhydride | 22.2 |
| 22b | 4a | 4,020 | 28.0 | 64.0 | 1,760 | 201 | Phthalic Anhydride | 33.8 |
| 23b | 4a | 4,020 | 28.0 | 64.0 | 1,760 | 205 | Citraconic Anhydride | 26.2 |

TABLE 3

| Ex. No. of Acid Ester | Solvent | Amt. Solvent (grs.) | Esterification Temp., °C. | Time of Esterification (hrs.) | Water Out (cc.) |
|---|---|---|---|---|---|
| 1b | #7-3 | 265 | 140 | 1 | 8.7 |
| 2b | #7-3 | 235 | 142 | 3/4 | 25.4 |
| 3b | #7-3 | 242 | 155 | 1/2 | 25.4 |
| 4b | #7-3 | 283 | 160 | 2⅜ | 1.2 |
| 5b | #7-3 | 253 | 151 | 1½ | 1.8 |
| 6b | #7-3 | 298 | 157 | 3/4 | 10.0 |
| 7b | #7-3 | 242 | 157 | 2¼ | 5.0 |
| 8b | #7-3 | 231 | 152 | 1 | 15.6 |
| 9b | #7-3 | 246 | 144 | 1 | |
| 10b | #7-3 | 236 | 156 | 2 | 5½ |
| 11b | #7-3 | 240 | 155 | ½ | |
| 12b | #7-3 | 253 | 185 | 2 | 5.4 |
| 13b | #7-3 | 227 | 175 | 2¼ | 4.4 |
| 14b | #7-3 | 230 | 146 | 1 | 13.0 |
| 15b | #7-3 | 230 | 154 | 5¼ | |
| 16b | #7-3 | 231 | 164 | 3/4 | |
| 17b | #7-3 | 222 | 158 | 4 | |
| 18b | #7-3 | 236 | 159 | 3¼ | 4.0 |
| 19b | #7-3 | 239 | 184 | 1 | 4.3 |
| 20b | #7-3 | 219 | 144 | 3/4 | 12.8 |
| 21b | #7-3 | 223 | 157 | 4 | |
| 22b | #7-3 | 235 | 139 | 1¾ | |
| 23b | #7-3 | 231 | 146 | | |

The procedure for manufacturing the esters has been illustrated by preceding examples. If, for any reason, reaction does not take place in a manner that is acceptable, attention should be directed to the following details:

(a) Recheck the hydroxyl or acetyl value of the diol and use a stoichiometrically equivalent amount of acid;

(b) If the reaction does not proceed with reasonable speed, either raise the temperatures indicated or else extend the period of time up to 12 or 16 hours, if need be;

(c) If necessary, use ½% of para-toluene sulfonic acid or some other acid as a catalyst;

(d) If the esterification does not produce a clear product, a check should be made to see if an inorganic salt such as sodium chloride or sodium sulfate is not precipitating out. Such salt should be eliminated, at least for exploration experimentation, and can be removed by filtering. Everything else being equal, as the size of the molecule increases and the reactive hydroxyl radical represents a smaller fraction of the entire molecule, more difficulty is involved in obtaining complete esterification.

Even under the most carefully controlled conditions of oxypropylation involving comparatively low temperatures and long time of reaction, there are formed certain compounds whose composition is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances, an attempt to react the stoichiometric amount of a polycarboxy acid with the oxypropylated derivative results in an excess of the carboxylated reactant, for the reason that apparently under conditions of reaction less reactive hydroxyl radicals are present than indicated by the hydroxyl value. Under such circumstances, there is simply a residue of the carboxylic reactant which can be removed by filtration, or, if desired, the esterification procedure can be repeated, using an appropriately reduced ratio of carboxylic reactant.

Even the determination of the hydroxyl value and conventional procedure leaves much to be desired, due either to the cogeneric materials previously referred to, or, for that matter, the presence of any inorganic salts or propylene oxide. Obviously, this oxide should be eliminated.

The solvent employed, if any, can be removed from the finished ester by distillation, and particularly vacuum distillation. The final products or liquids are generally dark amber to amber in color, and show moderate viscosity. They can be bleached with bleaching clays, filtering chars, and the like. However, for the purpose of demulsification or the like, color is not a factor and decolorization is not justified.

In the above instances I have permitted the solvents to remain present in the final reaction mass. In other instances, I have followed the same procedure, using decalin or a mixture of decalin or benzene in the same manner and ultimately removed all the solvents by vacuum distillation. Appearances of the final products are much the same as the diols before esterification, and in some instances, were somewhat darker in color and had a faint reddish cast, and perhaps somewhat more viscous.

PART 3

Previous reference has been made to the fact that diols such as polypropylene glycol of approximately 2,000 molecular weight, for example, have been esterified with dicarboxy acids and employed as demulsifying agents. On first examination, the difference between the herein described products and such comparable products appears to be rather insignificant. In fact, the difference is such that it fails to explain the fact that compounds of the kind herein described may be, and frequently are, 10%, 15%, or 20% better on a quantitative basis than the simpler compound previously described, and demulsify faster and give cleaner oil in many instances. The method of making such comparative tests has been described in a booklet entitled "Treating Oil Field Emulsion," used in the Vocational Training Courses, Petroleum Industry Series, of the American Petroleum Institute.

The difference, of course, does not reside in the carboxy acid but in the diol. Momentarily an effort will be made to emphasize certain things in regard to the structure of a polypropylene glycol, such as polypropylene glycol of a 2,000 molecular weight. Propylene glycol has a primary alcohol radical and a secondary alcohol radical. In this sense the building unit which forms polypropylene glycols is not symmetrical. Obviously, then, polypropylene glycols can be obtained, at least theoretically, in which two secondary alcohol groups are united or a secondary alcohol group is united to a primary alcohol group, etherization being involved, of course, in each instance.

Usually, no effort is made to differentiate between oxypropylation taking place, for example, at the primary alcohol radical or the secondary alcohol radical. Actually, when such products are obtained, such as a high molal polypropylene glycol or the products obtained in the manner herein described, one does not obtain a single derivative such as $HO(RO)_nH$, in which $n$ has one and only one value, for instance, 14, 15 or 16, or the like. Rather, one obtains a cogeneric mixture of closely related or touching homologues. These materials invariably have high molecular weights and cannot be separated from one another by any known procedure without decomposition. The properties of such mixture represent the contribution of the various individual members of the mixture. On a statistical basis, of course, $n$ can be appropriately specified. For practical purposes, one need only consider the oxypropylation of a monohydric alcohol, because, in essence, this is substantially the mechanism involved. Even in such instances where one is concerned with a monohydric reactant one cannot draw a single formula and say that by following such procedure one can readily obtain 80% or 90% or 100% of such compound. However, in the case of at least monohydric initial reactants one can readily draw the formulas of a large number of compounds which appear in some of the probable mixtures, or can be prepared as components and mixtures which are manufactured conventionally.

Simply by way of illustration reference is made to the co-pending application of De Groote, Wirtel and Pettingill, Serial No. 109,791, filed August 11, 1949, now Patent No. 2,549,434.

However, momentarily referring again to a monohydric initial reactant, it is obvious that if one selects any such simple hydroxylated compound and subjects such compound to oxyalkylation, such as oxyethylation, or oxypropylation, it becomes obvious that one is really producing a polymer of the alkylene oxides, except for the terminal group. This is particularly true where the amount of oxide added is comparatively large, for instance, 10, 20, 30, 40, or 50 units. If such compound is subjected to oxyethylation so as to introduce 30 units of ethylene oxide, it is well known that one does not obtain a single constituent, which, for the sake of convenience, may be indicated as $RO(C_2H_4O)_{30}OH$. Instead, one obtains a cogeneric mixture of closely related homologues, in which the formula may be shown as the following, $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description, or else consider the value of $n$, in formulas such as those which have appeared previously and which appear in the claims, as representing both individual constituents in which $n$ has a single definite value, and also with the understanding that $n$ represents the average statistical value based on the assumption of completeness of reaction.

This may be illustrated as follows: Assume that in any particular example, the molal ratio of the propylene oxide to the diol is 15 to 1. Actually, one obtains products in which $n$ probably varies from 10 to 20, perhaps even further. The average value, however, is 15, assuming, as previously stated, that the reaction is complete. The product described by the formula is best described also in terms of method of manufacture.

However, in the instant situation it becomes obvious that if an ordinary high molal propylene glycol is compared to strings of white beads of various lengths, the diols herein employed as intermediates, are characterized by the presence of a black bead, i. e., a radical which corresponds to the radical derived from resorcinol or oxyethylated resorcinol, as previously described.

Furthermore, it becomes obvious now that one has a non-symmetrical radical in the majority of cases, for the reason that in the cogeneric mixture going back to the original formula:

$$(HOOC)_{n'''}R\overset{O}{\overset{\|}{C}}(OC_3H_6)_nOR'O(C_3H_6O)_{n'}\overset{O}{\overset{\|}{C}}R(COOH)_{n''}$$

$n$ and $n'$ are usually not equal. For instance, if one introduces 15 moles of propylene oxide, $n$ and $n'$ could not be equal, insofar that the nearest approach to equality is where the value of $n'$ is 7 and $n$ is 8. However, even in the case of an even number such as 20, 30, 40, or 50, it is also obvious that $n$ and $n'$ will not be equal in light of what has been said previously. Both sides of the molecule are not going to grow with equal rapidity, i. e., to the same size. Thus, the diol herein employed is differentiated from polypropylene diol, 2,000, for example, in that (a) it carries a heterogeneous unit, i. e., a unit other than a propylene glycol or propylene oxide unit, (b) such unit is off center, and (c) that unit, of course, must have some effect in the range with which the linear molecules can be drawn together by hydrogen binding or van der Waals forces, or whatever else may be involved.

Furthermore, in the present instance, due to the initial raw material employed, i. e., an aromatic material, there is a ring structure present, i. e., a phenyl radical which is not present in the polypropylene glycol.

What has been said previously can be emphasized in the following manner: It has been pointed out previously that in the last formula immediately preceding, $n$ or $n'$ could be zero. Under the conditions of manufacture, as described in Part 2, it is extremely unlikely that $n$ is over zero. However, such compounds can be prepared readily with comparatively little difficulty by resorting to a blocking effect or reaction. For instance, if a diol prepared as previously described is esterified with a low molal acid such as acetic acid, mole for mole, and such product subjected to oxyalkylation, using a catalyst, such as sodium methylate, and guarding against the presence of any water, it becomes evident that all the propylene oxide introduced, for instance, 15 to 80 molecules per polyhydric alcohol, necessarily must enter at one side only. If such product is then saponified so as to decompose the acetic acid ester, and then acidified so as to liberate the water-soluble acetic acid and the water-insoluble diol, a separation can be made and such diol then subjected to esterification, as described in Part 2, preceding. Such esters, of course, actually represent products where either $n$ or $n'$ is zero. Also, intermediate procedures can be employed, i. e., following the same esterification step after partial oxypropylation. For instance, one might oxypropylate with one-half the ultimate amount of propylene oxide to be used and then stop the reaction. One could then convert this partial oxypropylated intermediate into an ester by reaction of one mole of acetic acid with one mole of diol. This ester could then be oxypropylated with all the remaining propylene oxide. The final product so obtained could be saponified and acidified so as to eliminate the water-soluble acetic acid and free the obviously unsymmetrical diol, which, incidentally, should also be kerosene-soluble.

From a practical standpoint I have found no advantage in going to this extra step, but it does emphasize one of the differences in structure between the hereindescribed diols employed as intermediates and high molal polypropylene glycol, such as polypropylene glycol 2,000.

PART 4

As pointed out previously, the final product obtained is a fractional ester having free carboxyl radicals. Such product can be used as an intermediate for conversion into other derivatives which are effective for various purposes, such as the breaking of petroleum emulsions of the kind herein described. For instance, such product can be neutralized with an amine so as to increase its water-solubility such as triethanolamine, tripropanolamine, oxyethylated triethanolamine, etc. Similarly, such product can be neutralized with some amine which tends to reduce the water-solubility such as cyclohexylamine, benzylamine, decylamine, tetradecylamine, octadecylamine, etc. Furthermore, the residual carboxyl radicals can be esterified with alcohols, such as low molal alcohols, methyl, ethyl, propyl, butyl, etc., and also high molal alcohols, such as octyl, decyl, cyclohexanol, benzyl alcohol, octadecyl alcohol, etc. Such products are also valuable for a variety of purposes, due to their modified solubility. This is particularly true where surface-active materials are of value, and especially in demulsification of water-in-oil emulsions.

Having thus described my invention, what I claim as new and desire to secure by Letters Patent is:

1. Hydrophile synthetic products; said hydrophile synthetic products being characterized by the following formula:

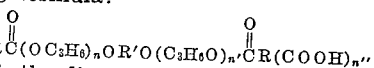

in which R' is the divalent radical obtained from a member selected from the class consisting of

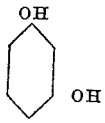

and

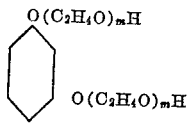

with the proviso that $m$ is a numeral varying from 0 to 4, and with the further proviso that the sum of both occurrences of $m$ is not over 4, and not more than one occurrence of $m$ is 0; $n$ and $n'$ are numerals with the proviso that $n$ and $n'$ equal a sum varying from 15 to 80, and $n''$ is a whole number not over 2, and R is the radical of a polybasic acid having not over 8 carbon atoms and composed of carbon, hydrogen and oxygen of the formula:

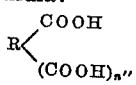

in which $n''$ has its previous significance.

2. Hydrophile synthetic products; said hydrophile synthetic products being characterized by the following formula:

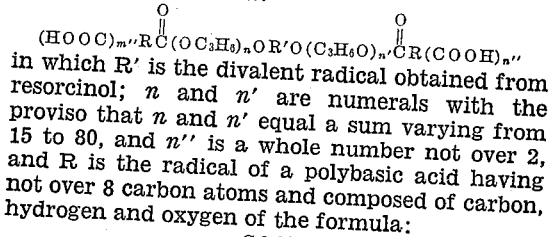

in which R' is the divalent radical obtained from resorcinol; $n$ and $n'$ are numerals with the proviso that $n$ and $n'$ equal a sum varying from 15 to 80, and $n''$ is a whole number not over 2, and R is the radical of a polybasic acid having not over 8 carbon atoms and composed of carbon, hydrogen and oxygen of the formula:

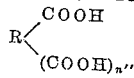

in which $n''$ has its previous significance.

3. Hydrophile synthetic products; said hydrophile synthetic products being characterized by the following formula:

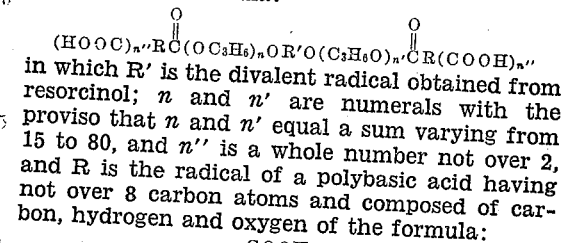

in which R' is the divalent radical obtained from resorcinol; $n$ and $n'$ are numerals with the proviso that $n$ and $n'$ equal a sum varying from 15 to 80, and $n''$ is a whole number not over 2, and R is the radical of a polybasic acid having not over 8 carbon atoms and composed of carbon, hydrogen and oxygen of the formula:

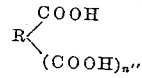

in which $n'$ has its previous significance.

4. Hydrophile synthetic products; said hydrophile synthetic products being characterized by the following formula:

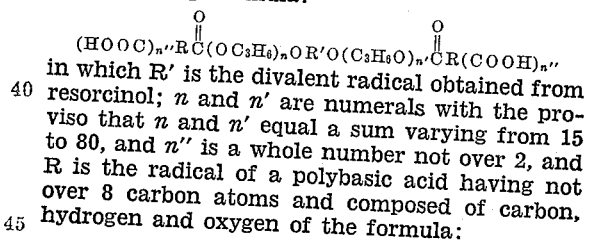

in which R' is the divalent radical obtained from resorcinol; $n$ and $n'$ are numerals with the proviso that $n$ and $n'$ equal a sum varying from 15 to 80, and $n''$ is a whole number not over 2, and R is the radical of a polybasic acid having not over 8 carbon atoms and composed of carbon, hydrogen and oxygen of the formula:

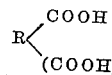

in which $n'$ has its previous significance; said polycarboxy acid having not over 8 carbon atoms.

5. Hydrophile synthetic products; said hydrophile synthetic products being characterized by the following formula:

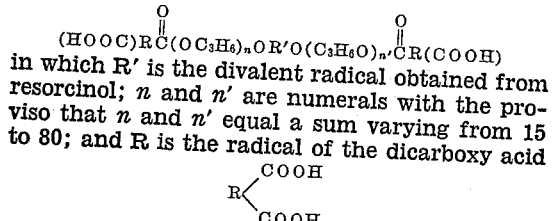

in which R' is the divalent radical obtained from resorcinol; $n$ and $n'$ are numerals with the proviso that $n$ and $n'$ equal a sum varying from 15 to 80; and R is the radical of the dicarboxy acid

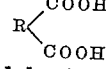

said dicarboxy acid having not over 8 carbon atoms.

6. The product of claim 5, wherein the dicarboxy acid is phthalic acid.

7. The product of claim 5, wherein the dicarboxy acid is maleic acid.

8. The product of claim 5, wherein the dicarboxy acid is succinic acid.

9. The product of claim 5, wherein the dicarboxy acid is citraconic acid.

10. The product of claim 5, wherein the dicarboxy acid is diglycollic acid.

No references cited.